2 Sheets—Sheet 1.
G. DAIMLER.
GAS ENGINE.
No. 10,759. Reissued Aug. 24, 1886.
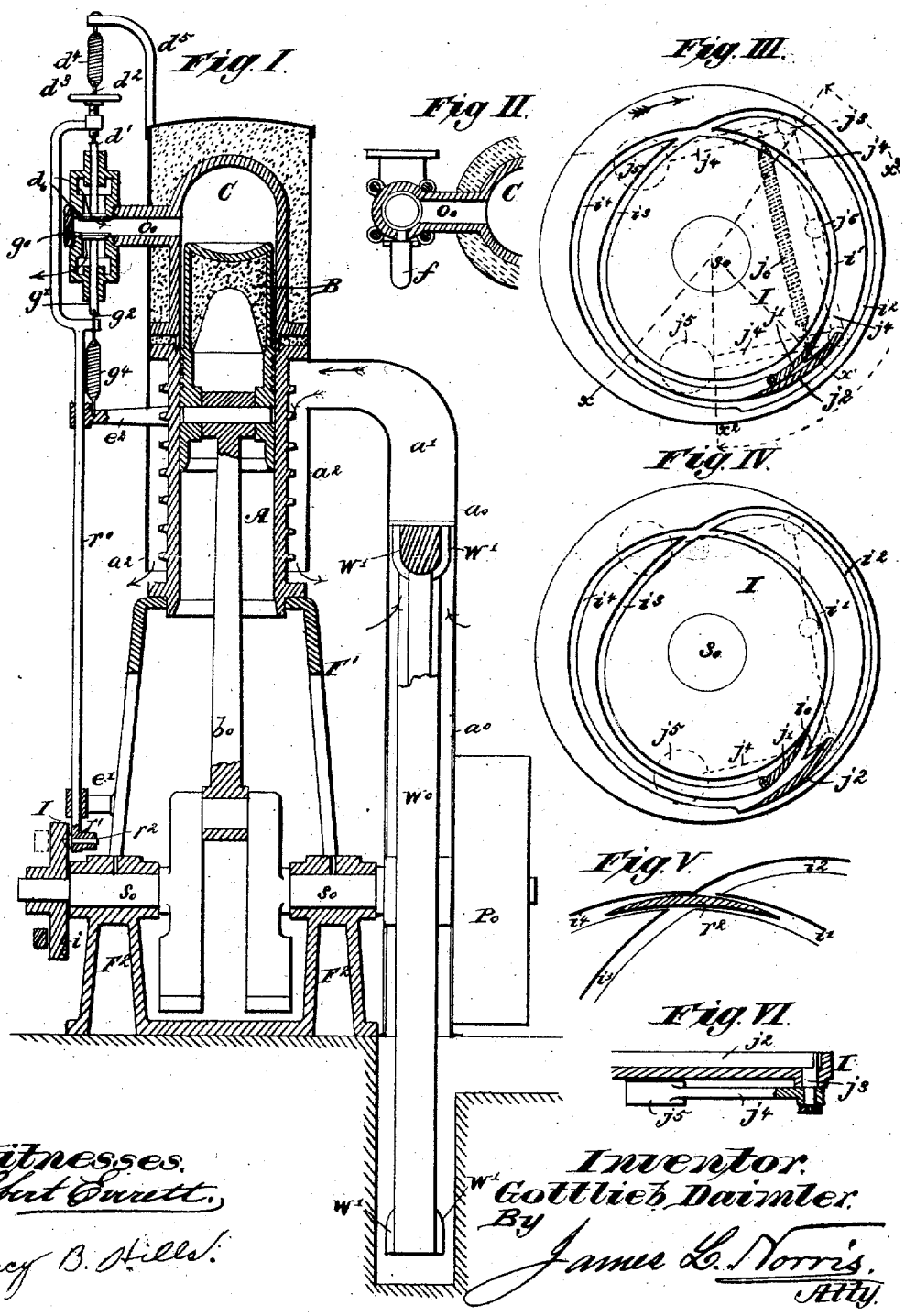
Witnesses.
Robt Ewett.
Percy B. Hills.
Inventor.
Gottlieb Daimler.
By
James L. Norris.
Atty.

2 Sheets—Sheet 2.
G. DAIMLER.
GAS ENGINE.
No. 10,759. Reissued Aug. 24, 1886.
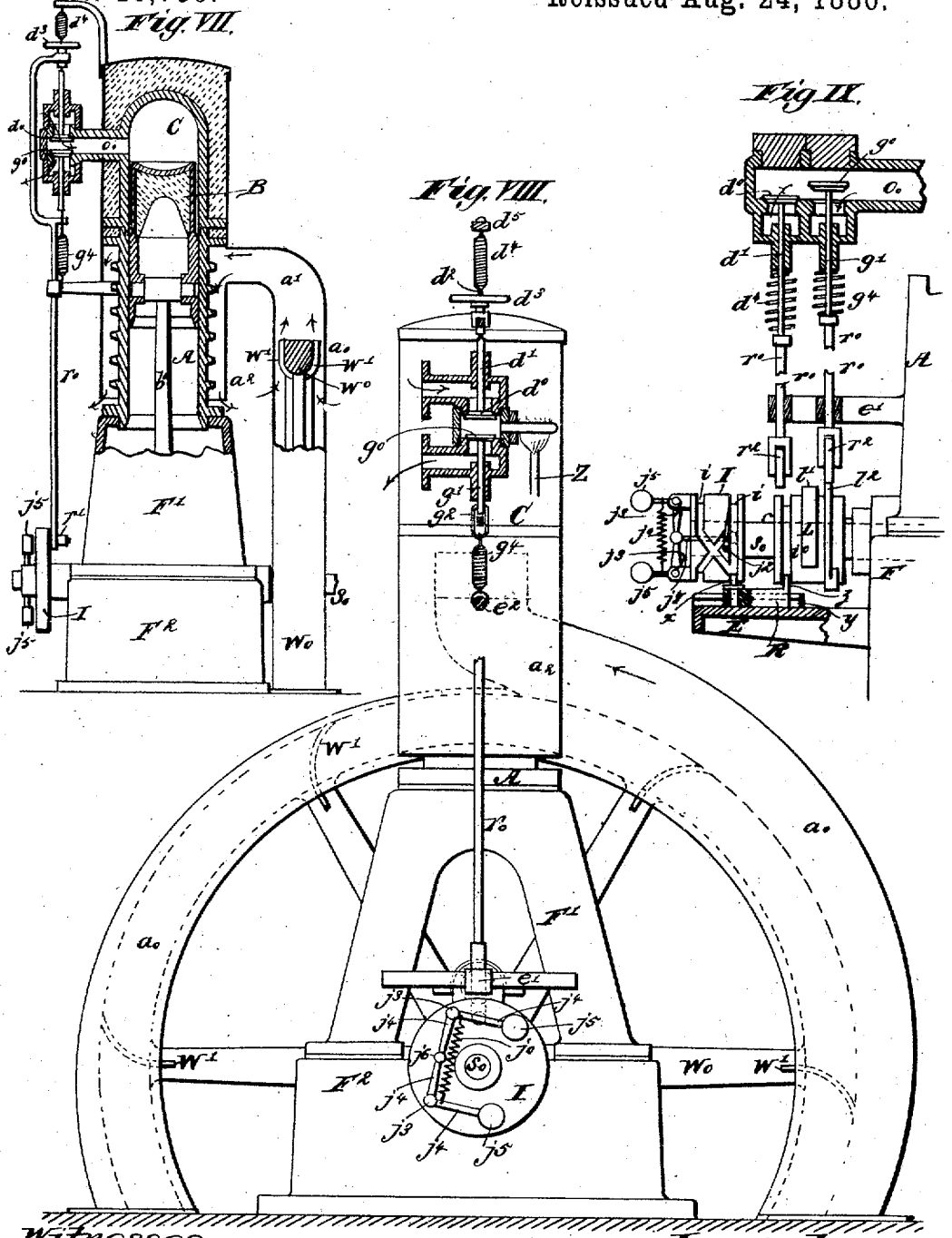
Witnesses.
Robert Everett.
Percy B. Hills.
Inventor:
Gottlieb Daimler.
By James L. Norris.
Att'y.

UNITED STATES PATENT OFFICE.

GOTTLIEB DAIMLER, OF CANNSTADT, WÜRTEMBERG, GERMANY.

GAS-ENGINE.

SPECIFICATION forming part of Reissued Letters Patent No. 10,759, dated August 24, 1886.

Original No. 313,923, dated March 17, 1885. Application for reissue filed June 7, 1886. Serial No. 204,389.

*To all whom it may concern:*

Be it known that I, GOTTLIEB DAIMLER, a citizen of Germany, residing at Cannstadt, Würtemberg, Germany, have invented certain new and useful Improvements in Gas-Engines, of which the following is a specification.

My invention relates to improvements in gas-engines of that class where the motive power is created by the compression of combustible gases within a suitable cylinder, and by the sudden compression by their contact with the heated walls of said cylinder.

It is the object of my invention to overcome certain objectionable points of the ordinary, called "Otto," gas-engines—to wit, to simplify the construction, and to do away with the troublesome cooling-water, which was necessary in said engines, but very uneconomical, as it was carrying off part of the heat of the fuel.

The first part of my invention consists in the combination of the crank-shaft and the valve-chest of a gas-motor with a cam within which a curve is provided, said curve running twice around the shaft and returning into itself, and operating by means of a slide-shoe the valve-stem of the valve-chest, so as to cause for each two revolutions of the crank-shaft one explosion within the compression-cylinder.

The second part of my invention consists in the combination of the suitably-shaped valve-stem operating the inlet and outlet valve of a gas-motor with an adjusting-screw for regulating the quantity of gas charged to the compression-cylinder.

The third part of my invention consists in the combination of a centrifugal regulator with the cam governing the inlet and outlet of the combustible gas, said regulator, when necessary, causing the inlet-valve to remain shut for a number of revolutions.

The fourth part of my invention consists of a cooling device for the working-cylinder of a gas-motor, consisting of curved blades arranged on both sides of the rim of the fly-wheel, said rim working within a suitable casing or channel, which latter communicates with a cylinder incasing the working-cylinder of the motor.

My improved gas-motor is constructed with a cast-iron stand supporting the working and the compression cylinder, and bolted rigidly fast on top of a base-framing, wherein the crank with cam and fly-wheel is journaled. The compression-cylinder is placed on top of the working-cylinder, and is of similar construction as the apparatus used in the process for which I applied for a patent in another application simultaneously with this one. Said compression-cylinder has the shape of an inverted cap open on the bottom, with an outlet cast onto the side of the upper portion of the cylinder. A heavy cover of non-heat-conducting material—such as clay, slag, wool, &c.—prevents any radiation of heat from the compression-cylinder, and this latter is bolted rigidly fast and air-tightly down on the working-cylinder. A cast-iron hollow piston is working air-tightly within this cylinder, and reaches with its upper portion, the walls of which part are cast very thin, into the compression-cylinder, said upper portion of the piston being well coated on the inside with insulating material to prevent radiation of heat. A cross-pin is provided within the lower portion of said piston, and a connecting-rod linked thereto transmits motion from the piston to a double crank on the crank-shaft. A heavy and large fly-wheel is mounted on one end of said shaft, and the cam for working the valves of inlet and outlet on the other end. The fly-wheel is provided on both sides of its rim with curved blades, and said rim on the whole circumference of the wheel is incased by and revolves within a channel or flue, which serves to receive the air forced outwardly, in centrifugal and tangential sense, by the curved blades, and to guide said current of air through a suitable flue into the top end of a cylindrical casing which surrounds the working-cylinder concentrically, leaving a free space between the working-cylinder and the casing. This casing, further being shut at the top, is open at the bottom, and forces the air which is pressed in from the fly-wheel to strike the outside walls of the working-cylinder, said walls being provided with a series of annular ribs cast on in order to delay the cold current of air as long as possible, and thus to cool off the working-cylinder, which will become hot from the compression-cylinder. By the device just described the machine cools its working-cylinder automatically, and said contrivance will be amply sufficient for fulfilling its purpose.

The cam working the valves is constructed as follows: A deep but narrow groove is provide on one of the faces of the cam's disk. Said groove forms a curve, which runs twice around the shaft and returns again into itself, so as to appear like a double loop, one inside the other. A sliding shoe attached to the end of the valve-rod is sliding within said groove, the valve-rod being kept within guides at a radial position with regard to the crank-shaft and cam, said guides cast on the one to the cast-iron stand supporting the working-cylinder, and the other to the working-cylinder itself. The valve-rod, therefore, will rise and fall, according to the shape of the groove within the cam's disk, and will lift or drop the inlet and outlet valves of the valve-chest which is provided at the side opening of the compression-cylinder.

The valve-chest is constructed with two valves, screwed air-tightly into a suitable sleeve cast onto the impression-cylinder at the end of the side opening therein. Helical springs are attached to suitable brackets, one of which is provided on the compression-cylinder and the other on the working-cylinder, and said springs keep the valves shut, owing to their contracting power. These springs are connected to the ends of the valve-stems on the inlet-valve by means of a thin rod and on the outlet-valve by means of an elongated ring. Short arms projecting from the valve-rod reach over the ends of the valve-stems. The arm for the inlet-valve carries a thumb-screw for regulating the time of opening, said screw screwed into said arm and sleeved on the thin rod between valve-stem and helical spring. The arm for the outlet-valve, however, reaches into and between the elongated ring connecting the valve-stem and helical spring. Whenever the valve-rod moves, the projecting arms push alternately against the valve-stems, and will open the valves at short intervals for the inlet-valve. However, the arm of the valve-rod will not act directly on the stem, but only by means of the thumb-screw, which, by being screwed farther out or into the arm of the valve-rod, will cause a later or earlier contact with and working of the valve-stem. By the adjustment of said thumb-screw, therefore, the inlet is either increased or decreased, also the quantity of gases charged into the cylinder is increased or decreased; or, also, the degree of compression, and therefore also the time of explosions or discharges will be made to occur earlier or later. The time of discharge by proper adjustment of the said screw may be regulated so as to coincide with the extreme position of the crank for compression, which will be best suited for an economical running of the machine. A priming-cap consisting of a tube of thin copper is fitted into the pipe cast onto the side of the compression-cylinder, and thereby the machine is started until the compression-cylinder becomes hot enough itself to make the priming-cap superfluous.

In order to secure a uniform speed for the machine, a centrifugal regulator is combined with the cam on the cam-shaft, the construction of which may be best understood with reference to the drawings, and will be given hereinafter.

In the drawings accompanying this specification, Figure I represents a vertical section through a complete gas-motor. Fig. II is a horizontal section through the compression-cylinder at the height of the side opening. Fig. III gives a view of the cam's disk with the curve such as it is when the regulator is not working. Fig. IV gives the same when the regulator is working. Fig. V illustrates the slide-shoe which is attached on the valve-rod. Fig. VI gives a part section through part of the regulator and the cam. Fig. VII is a part end view and part vertical section of the complete motor. Fig. VIII gives a side view of the motor and section through the valve-chest. Fig. IX illustrates a modified arrangement of valve-chest, cam, and centrifugal regulator, which is equivalent to the one illustrated in the other figures.

Similar letters of reference in different figures indicate similar parts.

In Fig. I, C represents the compression-cylinder, surrounded with a heavy layer of insulating material, to prevent radiation of heat, said compression-cylinder of the shape of an inverted cap bolted rigidly fast on top of the working-cylinder A, which is supported by the framing F', which again rests on the base-framing F². The working-cylinder A is incased by a cylinder of sheet-iron, $a'$, which leaves an annular hollow space between A and $a^2$. The outside walls of A are provided with annular ribs, and a flue, $a'$, connects cylinder $a^2$ with the annular flue $a^0$, said annular flue $a^0$ incasing the fly-wheel of the machine all along its rim. Inside of cylinder A a piston, B, is working, piston B consisting of an insulated upper part which reaches into cylinder C, and of a lower part which works air-tight within cylinder A. To the lower part the connecting-rod $b^0$ is linked, said rod $b^0$ transmitting motion to the double crank of crank-shaft $S^0$, which is journaled within frame F². Crank-shaft $S^0$ carries on one end cam I, for the working of the valves, and on the other end fly-wheel $w^0$ and driving-pulley $p^0$. The wheel $w^0$ serves as a reservoir for power, so as to overcome the dead-points of the crank, and as a fan for cooling the working-cylinder A, owing to a number of curved blades, $w'$, which are provided on its rim, and which create a current of air directed, as indicated by arrows, within the flue $a^0$, forcing said air by flue $a'$ into cylinder $a^2$, against the walls of the working-cylinder A. (See also Figs. VII and VIII.) Cam I (see Figs. I, III, IV, V, VI, VII, and VIII) is provided with grooves $i'$ $i^2$ $i^3$ $i^4$, said grooves guiding the slide-shoe $r^2$, which is fulcrumed, by means of a pin cast thereon, to the eye $r'$ of valve-rod $r^0$. Valve-rod $r^0$, having a to-and-fro motion, is guided within brackets $e'$ and $e^2$, and is provided with projecting arms at its one end, by which it alternately pushes against the valve-stem $g'$ and $d'$ of the inlet-valve $d^0$ and the outlet-valve $g^0$. Arrows in Figs. I, VII, and VIII mark the flow of gases in said valves when opened. The outlet-valve may communicate with the open air, and the inlet-valve with a suitable generator of combustible gas. Valves $g^0$ and $d^0$ are provided on a pipe or side opening cast onto cylinder C, and are mounted thereon so as to communicate with the opening $o^0$ of cylinder C. Helical springs $d^4$ and $g^4$ are attached to the ends of the valve-stems $d'$ and $g'$, by means of the intermediate rod, $d^6$, and annular link $g^2$, respectively. The helical spring $g^4$ being attached to bracket $e^2$, and spring $d^6$ attached to bracket $d^5$, owing to their contracting-power, keep valves $g^0$ and $d^0$ pressed tightly on the valve-seats, and allow said valves to be opened only when the arms of rod $r^0$ push against the stems $d'$ and $g'$. Said arm on the outlet-valve reaches between the annular link $g^2$, and the arm on the inlet-valve carries a thumb-screw, $d^3$, screwed therein, which screw is sleeved onto rod $d^1$. Therefore the arm of rod $r^0$ will not act directly on stem $d'$ of the inlet-valve; but, by means of the thumb-screw $d^3$ and by the adjustment of this latter, the moment of contact and of opening of valve $d^0$ may be altered. By screwing $d^3$ farther toward $d^0$ the valve $d^0$ will be opened earlier and will remain open longer, and the explosions will occur earlier, because the degree of compression becomes greater. By screwing it farther out or off from $d^0$ the explosion will be caused to occur later. By the adjustment of screw $d^3$, therefore, the moment of the explosions may be changed and may be made to coincide with the movement of maximum compression in the compression-cylinder or on the dead-point of the crank. On the cast-iron pipe $o^0$, and in open communication with $o^0$, a cap, $f$, (see Figs. II and VIII,) is provided, said cap serving for priming the charge of gases by means of a flame, Z, or other source of heat wherewith cap $f$ is heated. Cap $f$ is needed only at the beginning of the process, or when starting the motor when the rolls of cylinder C are still cold. Then the charge of gases, when compressed, has to be ignited by contact with the heated walls of the cap $f$, the walls of which are made very thin and of a good conductor of heat—as, for instance, copper. After a few explosions, however, the walls of cylinder C have become hot, the insulating coating surrounding the same retaining almost all the heat transmitted from the exploding gases to the walls of C, and then no more priming-cap is needed, because the hot walls of C will cause the ignition. Cam I, revolving as indicated by arrow in Fig. III, is provided with the grooves $i'$ $i^2$ $i^3$ $i^4$, which are thus devised. When the shoe $r^2$ runs within $i'$, the outlet-valve will be open from the point $x^2$ to the point $x'$, after which it will be closed. The inlet-valve will remain entirely closed. When $r^2$ is in $i^2$, the outlet-valve will be entirely open as the shoe passes through the part $x^3$. When $r^2$ is in $i^3$, the outlet-valve will be closed, and the inlet-valve will first open and then close. When $r^2$ is in $i^4$, the outlet-valve will be closed until $r^2$ arrives at the point $x$, when it will begin to open. The grooves are of such a shape that under ordinary circumstances shoe $r^2$ will enter groove $i^4$ after leaving $i'$. Then it will enter $i^2$, and then $i^3$. Grooves $i'$ and $i^4$ are connected by an intermediate groove, $i^0$, (see Fig. IV,) and a centrifugal regulator is combined with cam I, in order to regulate the speed of the motor. This regulator consists of two weights or balls, $j^5$ $j^5$, provided on one end of angular levers $j^4$ $j^4$, which are fulcrumed in $j^3$ $j^3$ to the cam I. The other ends of said angular levers $j^4$ are linked together in $j^6$, and a helical spring of suitable strength, $j^0$, connects and contracts said angular-levers, so that balls or weights $j^5$ $j^5$ are approaching each other. On one of the fulcrums $j^3$, and swinging with the angular lever $j^4$, a switch-piece, $j^2$, is provided, (see Fig. VI,) which, according to position of levers $j^4$ and weights $j^5$, keeps open communication between grooves $i'$ and $i^4$, or between $i'$ and $i^2$, and a lid, $j'$, is further fulcrumed onto cam I, in order to bridge groove $i^3$, so as to complete the connection between $i'$ and $i^4$, and to form one border of groove $i^0$. It will be seen, now, that when cam I runs at a certain fast speed the centrifugal force of weights $j^5$ will overcome the contracting-power of spring $j^0$, and the angular levers will swing until switch $j^2$ touches at the outside border of curve $i^4$. The centrifugal force will keep switch $j^2$ pressed against said border, and then shoe $r^2$, after leaving groove $i^4$, is forced to enter groove $i'$, instead of groove $i^2$. From groove $i'$, however, the shoe goes into $i^4$, and then again into $i'$, and so on until the speed of cam I has lessened, and until the centrifugal force of weights $j^5$ has become smaller, whereupon spring $j^0$ approaches again said weights, swinging back also switch $j^2$, and now shoe $r^2$ will enter, from $i^4$, groove $i^2$, and then $i^3$ $i'$, and again $i^4$ $i^2$ $i^3$ $i'$ and so on, until the speed has become greater again, as to move the centrifugal regulator. It will be seen, therefore, that when the speed of the machine is normal, or when the regulator is not acting, shoe $r^2$ will run through all four curves $i'$, $i^2$, $i^3$, and $i^4$, in the order of $i'$ $i^4$ $i^2$ $i^3$ $i'$ $i^4$ $i^2$ $i^3$, &c., and the play of the valves $d^0$ $g^0$ and of piston B will be as follows: Explosion will occur when both valves are shut, shoe $r^2$ being at the end of curve $i'$. Piston B is then in the position of maximal compression, as given in Figs. I and VII; or, in other words, the crank is on one of its dead-points. Piston B will be driven back out of cylinder C, while both valves remain shut, shoe $r^2$ running now within groove $i^4$, and this stroke of the piston is the only one during which the expanding power of the exploding gases is directly utilized, whereupon piston B returns again for the inward stroke, shoe $r^2$ running within groove $i^2$. The exhaust-valve, therefore, is opened during this inward stroke, and the products of combustion are partly pressed out of cylinder C by piston B. Shoe $r^2$ now enters groove $i^3$, and piston B will move out of cylinder C. Inlet-valve $d^0$ accordingly is opened, while the outlet $g^0$ is shut, and piston B sucks in a fresh charge of combustible gases. Then the shoe $r^2$ runs into groove $i'$, both valves remain shut, and simultaneously piston B begins its compression-stroke, compresses the gases, and explosion occurs again when shoe $r^2$ is at the end of groove $i'$ and piston B at the end of its compression-stroke, as given in Figs. I and VII. The same operation, as described, begins now again, and, as seen, one explosion occurs for each two revolutions. Whenever the motor begins to run faster than at its normal speed, the regulator will act, and then the shoe $r^2$ will run only within grooves $i'$ and $i^4$, or, in other words, no inlet will occur until the speed lessens again, owing to the fact that no more explosions occur, whereupon the switch-piece $j^2$ will open again groove $i^2$, and the shoe will run again through all four grooves. It will be seen that when the shoe is running only in grooves $i'$ $i^4$, as described, the outlet-valve will be opened as the shoe passes from the point $x$ to the point $x'$, being nearly full open at $x^2$, and then closing again as the shoe arrives at $x'$. By this arrangement it will be seen that after the occurrence of the last explosion the outlet-valve will be only opened for a short time, to allow of the escape of the combustion-gases under pressure, and will then remain closed, so as to prevent the cooling of the cylinder by drawing in a body of atmospheric air during the whole stroke, and then expelling it during the return-stroke. Instead of having the construction of cam I, shoe $r^2$, and rod $r^0$, as just described, I give as an equivalent the device shown in Fig. IX. The valves $g^0$ and $d^0$ are arranged here alongside each other. $o^0$ represents the side opening on the compression-cylinder C. $d$ is the inlet-valve; $g^0$, the outlet-valve; $d'$ $g'$, the stems, and $g^1$ $d^1$ helical springs, which by their expanding-power keep the valves tightly pressed down on the valve-seats as long as cam I does not touch the valve-rods $r^1$. The valve-rods $r^0$ $r^0$, guided within a bracket, $e'$, cast onto cylinder A, are provided at their ends with rollers $r^2$ $r^2$. Shaft $S^0$, journaled within the framing F, supporting cylinder A, carries two cams, I and L. Cam I is keyed fast on shaft $S^0$, and is combined with a centrifugal regulator in a similar manner as in the construction described in Figs. III, IV, V, VI, VIII. $j^3$ $j^3$ represent balls or weights; $j^4$ $j^4$, angular levers; $j^0$, a helical contracting-spring; $j^6$, the joint of the angular levers; $j^2$ $j^2$, the fulcrums fast to cam I, and $j^7$, attached to joint $j^6$, is a link connecting said joint to the switch-piece $j^2$. Grooves $i$, similar to those shown in Figs. III and IV, are provided on cam I, and the slide-shoe $x$ is running within said grooves $i$ $i$, and will be guided to and fro, together with the slide R, whenever cam I revolves. Slide R, with the slide-shoe $x$ provided thereon, is sliding within suitable grooves, $y$, of the bracket E, which is cast onto F, and said slide R, being further provided with a projecting pin, $z$, fitting into a groove, $l^0$, of the movable cam L, will slide said cam L to and fro on shaft $S^0$, according to the grooves on cam I. Cam L is provided with projecting rims or curves $l'$ and $l^2$, rim $l'$ called the "inlet-rim" and rim $l^2$ "exhaust-rim." Cam L is now slid in such a way on shaft $S^0$, owing to the suitably-shaped curves $i$ on cam I, that the operation of valves $d^0$ and $g^0$ will be the same as in the device shown in Figs. I to VIII, with the difference that when the regulator acts the exhaust-valve will remain fully open instead of being shut again after a part of the stroke has been made, as in the previous arrangement. It may depend on the nature of the combustible gases utilized which of these two contrivances is preferable.

In another application made by me for a patent, Serial No. 125,403, I have set forth the process of utilizing combustible gases as applied to the motor herein described. I hereby disclaim said process, disclaiming also any means of insulating the piston and compression-cylinder used for said process.

I am well aware that it is not new in gas and oil motors to use two cylinders side by side, a pumping or compression cylinder, and a so-called "working" or "explosion" cylinder, the piston within said cylinders working simultaneously, and the explosions occurring when both are on their dead-point. In said arrangement, also, one explosion and one compression occurs at each revolution of the crank. I do not lay any claim to such a device. In my novel arrangement of parts I use one and the same cylinder for compressing and exploding the gases, and one explosion occurs only for each two revolutions of the crank on one of the four dead-points of this latter.

Having thus fully described my invention, what I claim as new, and wish to secure by Letters Patent, is—

1. In gas or oil motors, in combination with a crank-shaft and valve-chest, as shown and described, a cam with a double-loop curve and a slide-shoe operated thereby, said slide-shoe fulcrumed to and operating the valve-rod which works the inlet and outlet valves, so as to cause one complete operation of parts for each two revolutions of the crank-shaft.

2. In gas or oil motors, in combination with crank-shaft $S^0$, connecting-rod $b^0$, piston B, working within cylinder A, and insulated compression-cylinder C, pipe $o^0$, valves $d^0$ $g^0$, contracting-springs $g^1$ and $d^1$, valve-rod $r^0$, with slide-shoe $r^2$, fulcrumed thereon, said shoe operated by grooves $i'$ $i^2$ $i^3$ $i^4$ $i^0$ in cam I on shaft $S^0$, guide-brackets $e'$ $e^2$, and fly-wheel $w^0$, all substantially as shown, and for the purpose set forth.

3. The combination of the suitably-shaped valve-rod of a gas or oil motor with a projecting arm pushing against the valve-stem and opening the inlet-valve, and an adjusting-screw screwed into said projecting arm for regulating the quantity of gases or the moment of priming the same.

4. In combination with the compression-cylinder, working-cylinder, with piston connecting-rod, crank-shaft, and cam of a gas or oil motor, the suitably-shaped valve-rod $r^4$, inlet-valve $d^0$, mounted on pipe $o^0$, valve-stem $d'$, contracting-spring $d^4$, bracket $d^5$, rod $d^2$, and adjusting-screw $d^3$, substantially as shown and described.

5. In combination with the cam I of a gas or oil motor, said cam provided with a double-loop groove, a suitable slide-shoe guided within said groove and journaled at the end of the valve-rod governing the inlet and outlet valves of the motor, and a switch-piece combined with a centrifugal regulator and mounted on said cam, all for the purpose set forth and described.

6. In combination with the cam I of a gas or oil motor, said cam provided with the double-loop groove $i'$ $i^2$ $i^3$ $i^4$ $i^0$, and with a switch-piece, $j^2$, and a bridging-lid, $j'$, and mounted on the crank-shaft $S^0$, the fly-wheel $w^0$, mounted on the same shaft, the slide-shoe $r^2$, guided by said double-loop groove and journaled by means of a pin to the eye $r'$ at the end of valve-rod $r^3$, said valve-rod $r^3$ governing the inlet-valve $d^0$, and the outlet-valve $g^0$ of the compression-cylinder of the motor, and a centrifugal regulator consisting of weights or balls $j^5$ $j^5$, secured on the ends of the angular levers $j^4$ $j^4$, said angular levers connecting by the joint $j^6$ and by helical spring $j^0$, and fulcrumed in fulcrums $j^3$ $j^3$ to said cam I, all substantially as shown, and for the purpose set forth and described.

7. In combination with the fly-wheel and the working-cylinder of a gas or oil motor, annular ribs on the outside walls of the working-cylinder and suitably-curved blades provided on the rim of the fly-wheel, said rim working within a circular flue, said flue in communication with a hollow casing enveloping the working-cylinder, for the purpose set forth.

8. In combination with the fly-wheel $w^0$ and the working-cylinder A of a gas or oil motor, annular ribs provided on the outside walls of the working-cylinder, the curved blades $w$ on the rim of the fly-wheel, flue $a^0$, flue $a$, and casing $a^2$, surrounding cylinder A, substantially as shown, and for the purpose set forth.

In testimony whereof I have signed my name to this specification, in the presence of two subscribing witnesses, this 9th day of April, A. D. 1886.

GOTTLIEB DAIMLER.

Witnesses:
CARL FRIEDRICH KEPPLER,
WILHELM MAYBACH.